United States Patent
Donahue

(10) Patent No.: US 9,534,559 B2
(45) Date of Patent: Jan. 3, 2017

(54) VARIABLE THICKNESS COATINGS FOR CYLINDER LINERS

(75) Inventor: Richard John Donahue, West Bend, WI (US)

(73) Assignee: General Electric Company, Schenectady, NY (US)

( * ) Notice: Subject to any disclaimer, the term of this patent is extended or adjusted under 35 U.S.C. 154(b) by 779 days.

(21) Appl. No.: 13/527,699

(22) Filed: Jun. 20, 2012

(65) Prior Publication Data
US 2013/0340700 A1    Dec. 26, 2013

(51) Int. Cl.
*F02F 1/00* (2006.01)
*F16J 10/04* (2006.01)

(52) U.S. Cl.
CPC ............ *F02F 1/004* (2013.01); *F16J 10/04* (2013.01); *F05C 2253/12* (2013.01)

(58) Field of Classification Search
CPC .. Y10T 29/49272; Y10T 29/4927; F02F 1/004
USPC .......................... 123/193.2, 668; 29/888.061
See application file for complete search history.

(56) References Cited

U.S. PATENT DOCUMENTS

| | | | | |
|---|---|---|---|---|
| 3,620,137 A * | 11/1971 | Prasse | ...................... | F16J 10/04 123/193.2 |
| 4,202,310 A * | 5/1980 | Zorrilla | ..................... | F02F 1/12 123/193.2 |
| 4,466,399 A * | 8/1984 | Hinz | .................. | F02B 23/0675 123/193.1 |
| 4,528,079 A | 7/1985 | Badger | | |
| 4,706,616 A | 11/1987 | Yoshimitsu | | |
| 4,986,234 A * | 1/1991 | Bell | ........................ | F02B 77/02 123/193.4 |
| 5,363,821 A * | 11/1994 | Rao | ...................... | C10M 111/04 123/193.2 |
| 5,671,532 A | 9/1997 | Rao et al. | | |
| 5,806,481 A * | 9/1998 | Ikegaya | ................... | C25D 7/04 123/193.2 |
| 6,354,259 B2 | 3/2002 | Fischer et al. | | |
| 6,463,843 B2 * | 10/2002 | Pippert | ................. | F04B 53/166 92/170.1 |
| 6,508,240 B1 | 1/2003 | Bedwell et al. | | |
| 6,588,408 B2 * | 7/2003 | Bedwell | .................... | F02F 1/16 123/668 |

(Continued)

FOREIGN PATENT DOCUMENTS

CN    1333859 A    1/2002
CN    102971517 A    3/2013

(Continued)

OTHER PUBLICATIONS

EP Search Report and Written Opinion dated Nov. 11, 2013 from corresponding Application No. 13173010.3.

(Continued)

*Primary Examiner* — John Kwon
*Assistant Examiner* — James Kim
(74) *Attorney, Agent, or Firm* — Fletcher Yoder, P.C.

(57) ABSTRACT

A cylinder liner for an internal combustion engine includes a liner body defining a longitudinal axis coated with a coating on the interior surface of the liner body that varies in thickness along the longitudinal axis. The coating on the interior surface is thicker in a region of the interior surface corresponding to a top dead center or a bottom dead center of a piston.

19 Claims, 5 Drawing Sheets

(56) References Cited

U.S. PATENT DOCUMENTS

| | | | |
|---|---|---|---|
| 8,877,285 B2* | 11/2014 | Silk | B05D 5/005 |
| | | | 123/195 R |
| 2004/0226547 A1* | 11/2004 | Holzleitner | C23C 4/16 |
| | | | 123/668 |
| 2011/0023777 A1 | 2/2011 | Nishimura et al. | |
| 2013/0133608 A1 | 5/2013 | Vilhelmsson et al. | |

FOREIGN PATENT DOCUMENTS

| | | |
|---|---|---|
| DE | 10146850 A1 | 1/2003 |
| GB | 2296293 A | 6/1996 |
| JP | 01155061 A | 6/1989 |
| JP | H086636 B2 | 6/1989 |

OTHER PUBLICATIONS

CN Office Action; Application No. CN 201310246012.8; Dated Sep. 5, 2016; 7 pages.

* cited by examiner

VARIABLE THICKNESS COATINGS FOR CYLINDER LINERS

TECHNICAL FIELD

The subject matter disclosed herein in general relates to cylinder liners for internal combustion engines, and more specifically to variable thickness coatings for such cylinder liners.

BACKGROUND

A typical internal combustion engines includes one or more pistons, a cylinder block and one or more cylinder liners. The cylinder liner or sleeve is a cylindrical part that is fitted into cylinder block to form a cylinder. The cylinder liner is a critical component of the engine. The cylinder liner functions as a sliding surface for the piston while retaining the lubricant. It is desirable for cylinder liners to have low friction and high anti-galling properties. Galling is a form of adhesive wear surface damage arising between sliding solids resulting in microscopic, usually localized roughening in the creation of surface distortions. The cylinder liner is under high temperature and high pressure with the piston and piston rings sliding at high speeds. Consequently, it is desirable lower friction coefficient for cylinder liners to have significant heat and wear resistant properties.

Coatings have been developed to provide the cylinder liners with the desirable lower friction coefficients and heat and wear resistant properties. A number of technologies exist for applying the coating and a variety of coating materials may be used. Among the coating technologies that may be used are plasma spraying, high velocity oxygen fuel spraying, laser coating and chemical vapor deposition, and galvanic coating, among others. Materials used for coatings may include ceramics, composites of ceramics and metals (cermet), metal alloys, metal compounds (e.g. titanium oxides), among others. The materials used for coating of cylinder liners are expensive and add considerably to the manufacturing costs of the engines.

BRIEF DESCRIPTION OF THE INVENTION

In accordance with one exemplary non-limiting embodiment, the invention relates to a cylinder liner for an internal combustion engine including a liner body; the liner body defining a longitudinal axis and having a first end and a second end, a middle portion; and an interior surface; and a coating on the interior surface that varies in thickness along the longitudinal axis.

In another embodiment, the invention relates to an internal combustion engine assembly including a piston, a liner having an interior surface and a lubricant. The internal combustion engine also includes a coating on the interior surface of the liner with a thinner in a region of the liner where the lubricant provides at least partial hydrodynamic lubrication.

In another embodiment, the invention relates to a method of coating a cylinder liner for an internal combustion engine. The method includes coating a first interior surface of the liner with a first layer of predetermined thickness; coating a second interior surface with a second layer of predetermined thickness; and leaving a middle interior surface uncoated.

In another embodiment, the method includes coating a middle section with a third layer thinner than the first layer and the second layer.

Other features and advantages of the present invention will be apparent from the following more detailed description of the preferred embodiment, taken in conjunction with the accompanying drawings which illustrate, by way of example, the principles of the invention.

DETAILED DESCRIPTION OF THE INVENTION

Figure 1:
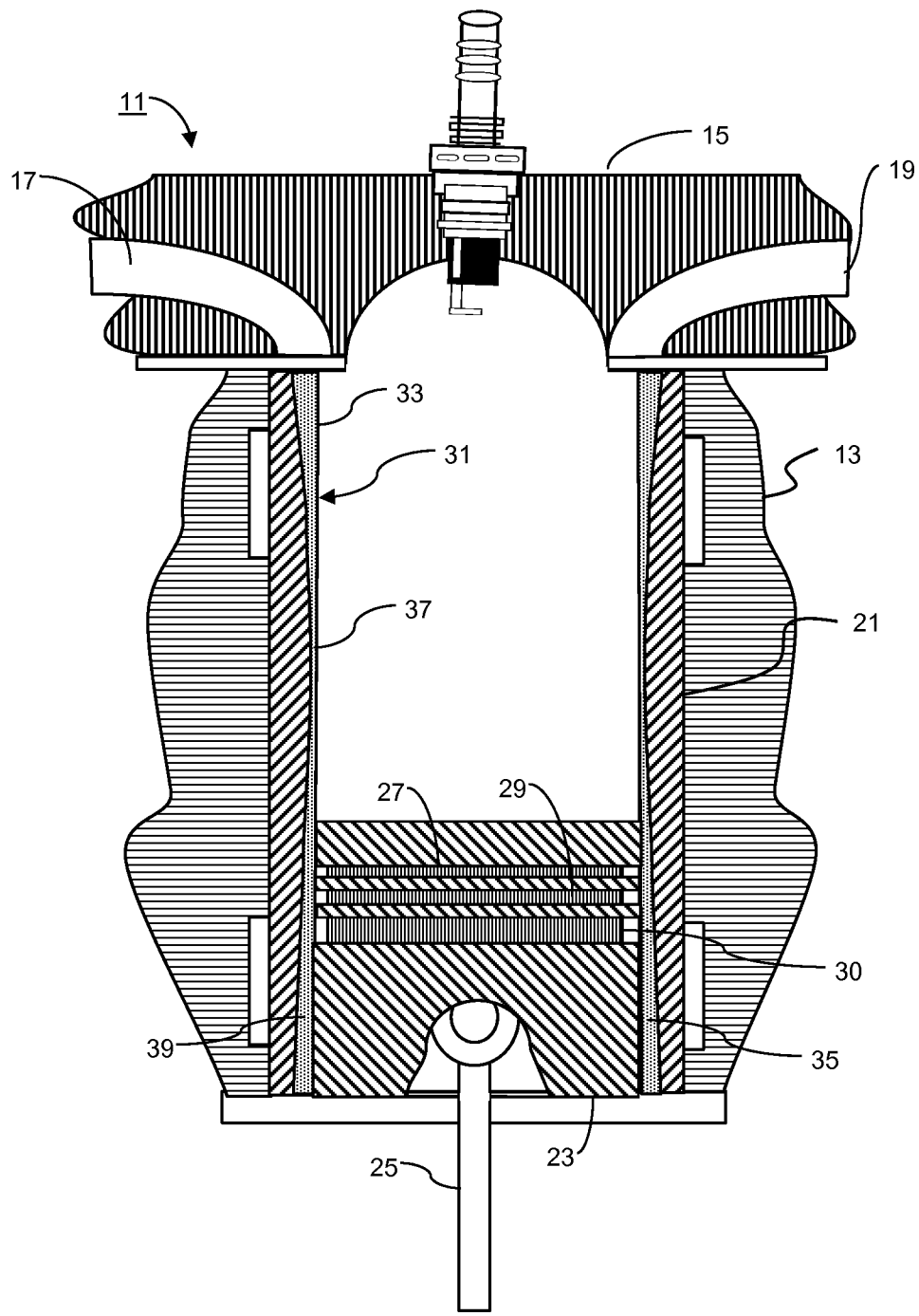
FIG. 1 is a cross section of a non-limiting piston assembly with a liner in accordance with one embodiment.
Figure 2:
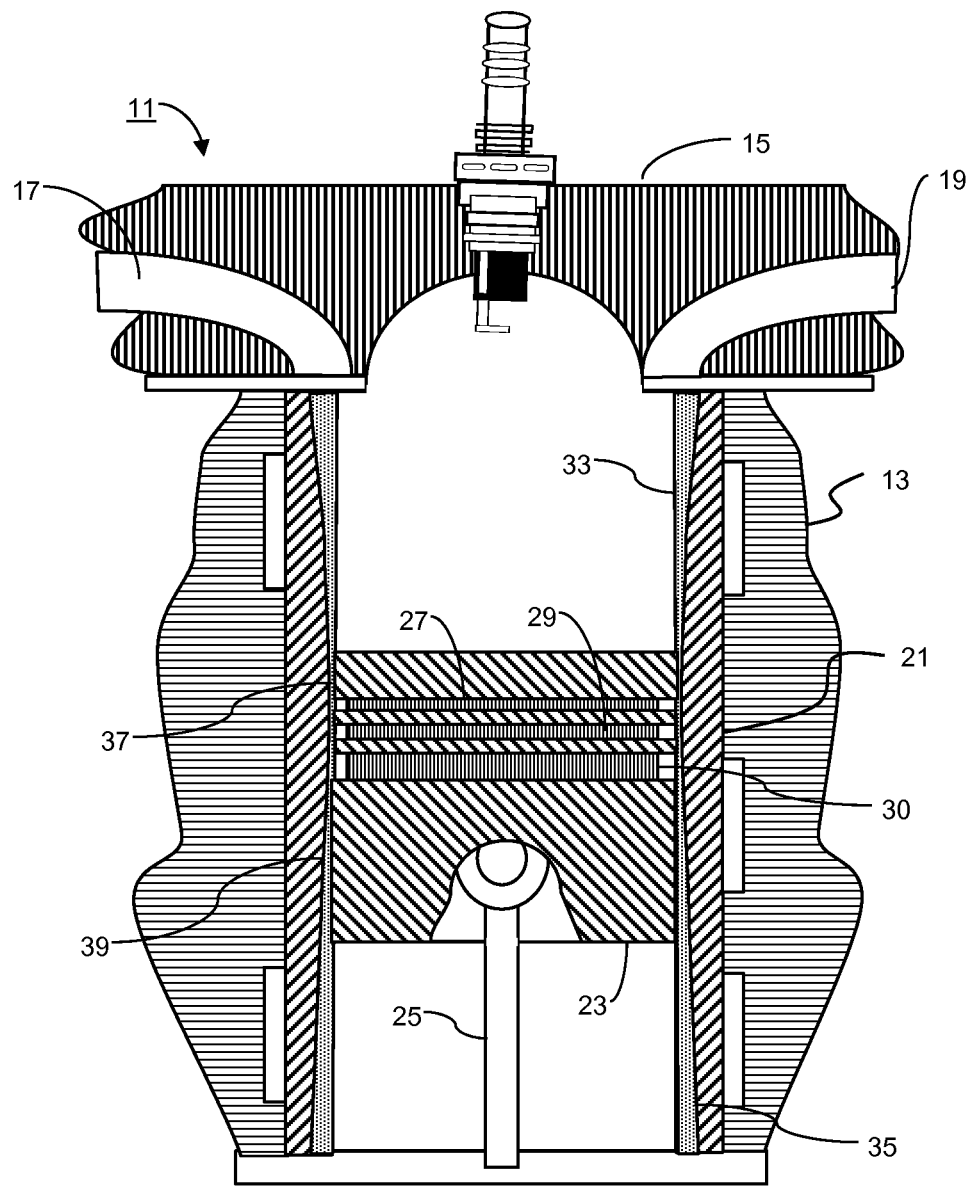
FIG. 2 is a cross section of a non-limiting piston assembly with a liner in accordance with one embodiment.

Illustrated in FIG. 1 is a representative example of an embodiment of an internal combustion engine assembly 11. Internal combustion engine assembly 11 may include a cylinder block 13 having a cylinder head 15 which may also have an intake port 17 and an exhaust port 19. Disposed in the cylinder block 13 is a cylinder liner 21 and a piston 23. In some embodiments the cylinder liner 21 may be a separate component from the cylinder block 13 that is installed into the block 13. In other embodiments the cylinder liner 21 may be an integral portion of the block 13 and only describes the portion of the 13 block in which the piston 23 is disposed. Piston 23 may be coupled to a connecting rod 25 and may also include compression rings 27 and 29 and an oil control ring 30 disposed on the periphery of the piston 23. The cylinder liner 21 may include a coating 31 applied to a liner body XX. As shown in the embodiment illustrated by FIG. 1 the coating 31 may have a variable thickness, with a thicker coating at the top dead center (TDC coating 33) and the bottom dead center (BDC coating 35). The coating at midstroke 37 may be thinner than the TDC coating 33 and BDC coating 35. In some embodiments there may be no coating in some or all of the midstroke portion 37. The coating 31 is applied to the interior surface 39 of the cylinder liner 21. FIG. 1 illustrates the piston at the bottom dead center, and FIG. 2 illustrates the piston 23 at the midstroke. In some embodiments, after the coating 31 is applied, the cylinder liner 21 is bored or honed in order to create a constant inner bore diameter (or radius) along the cylinder liner 21 and/or coating 31. In other embodiments, after the coating 31 is applied, the cylinder liner 21 is bored or honed but leaves a non-constant inner bore diameter along the cylinder liner 21 and/or coating 31. In still other embodiments, the cylinder liner 21 and/or coating 31 is not bored or honed after the coating 31 is applied. The engine assembly may be provided with a lubricant (not shown) that serves to reduce friction between the piston 23 and the cylinder liner 21 or coating 31.

In principle, the coating 31 on cylinder liner 21 must provide low friction as well as wear resistant properties. Friction is influenced by the type of surface. Friction in lubricated surfaces may be categorized as boundary friction (in regions with substantially no hydrodynamic lubrication), hydrodynamic friction (in regions with hydrodynamic lubrication), and mixed friction (in regions with at least partial hydrodynamic lubrication). Boundary friction relates to friction between surfaces that are completely dry and have only asperity contact between the surfaces. Hydrodynamic friction relates to friction between surfaces are completely separated by a lubricant with no asperity contact. Mixed friction occurs when boundary friction combines with hydrodynamic friction. Hydrodynamic friction is associated with hydrodynamic lubrication and boundary friction is associated with boundary conditions for the lubrication. Lubrication transitions from hydrodynamic to boundary conditions. Hydrodynamic lubrication is promoted near the midstroke where the sliding velocity of the piston is high. At and near the top dead center and bottom dead center of the piston stroke, were sliding velocity as mobile lubrication transitions from hydrodynamic to boundary conditions. With boundary lubrication, the oil film breaks down leading to asperity contact and wear. The wear conditions are the most severe at the top dead center (TDC) because there is less oil available, the pressures are higher, and the viscosity is lower due to higher temperature. The least wear occurs at the piston midstroke. Consequently, more coating is desirable at the top dead center and bottom dead center regions of the cylinder liner 21. The midstroke region requires less coating. Significant reduction in the use of coating materials may be obtained by using a thinner coating in the mid-stroke region of the piston.

Figure 3:
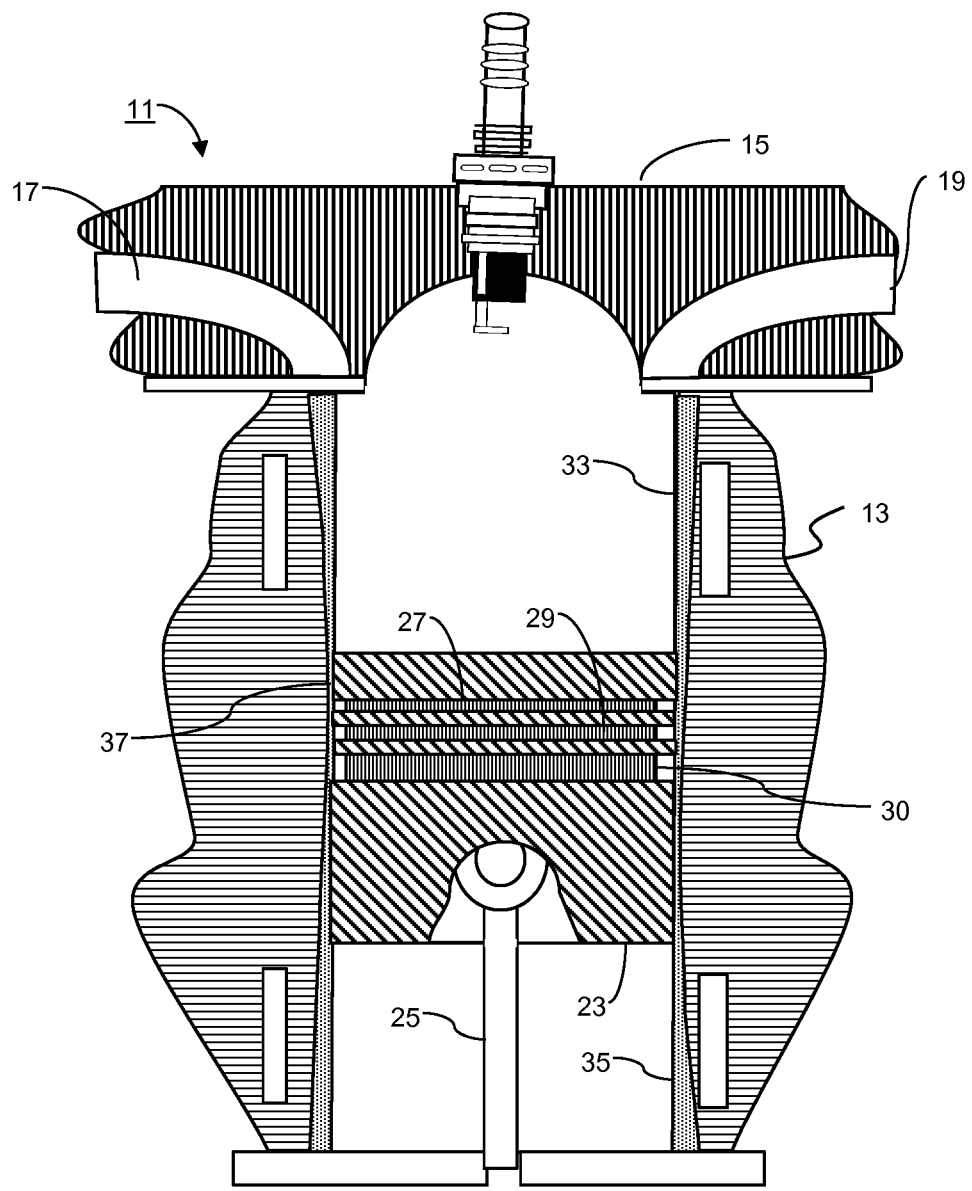
FIG. 3 is a cross section of a non-limiting piston assembly with a cylinder bore in accordance with one embodiment.

FIG. 3 is a representative example of an embodiment of an internal combustion engine assembly 11 without a separate cylinder liner component (the liner in this embodiment is an integral portion of a cylinder block 13). The internal combustion engine assembly may include the cylinder block 13 having a cylinder head 15 which may also have an intake port 17 and an exhaust port 19. Disposed in the cylinder block 13 is a piston 23. Piston 23 may be coupled to a connecting rod 25 and may also include compression rings 27 and 29 and oil control ring 30 disposed on the periphery of the piston 23. The cylinder block 13 may include a coating 31. As shown in the embodiment illustrated by FIG. 3 the coating 31 may have a variable thickness, with a thicker coating at the top dead center (TDC coating 33) and the bottom dead center (BDC coating 35). The coating at midstroke 37 may be thinner than the TDC coating 33 and BDC coating 35. The coating 31 is applied to the interior surface 39 of the cylinder block 13.

Figure 4:
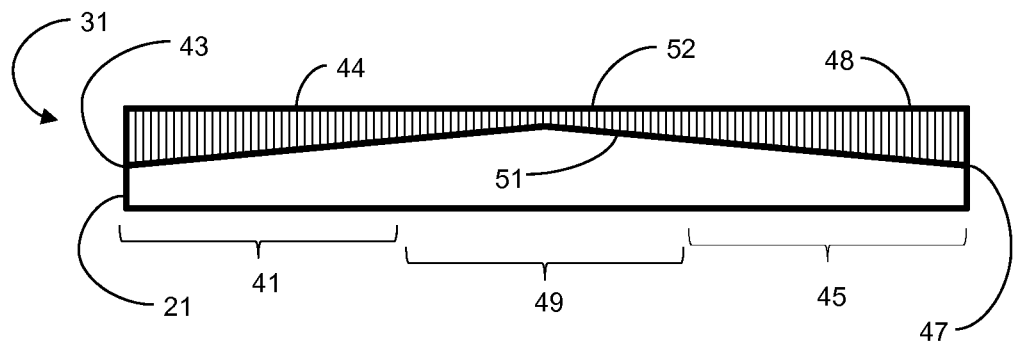
FIG. 4 is a non-limiting cross section of a liner in accordance with one embodiment.
Figure 5:
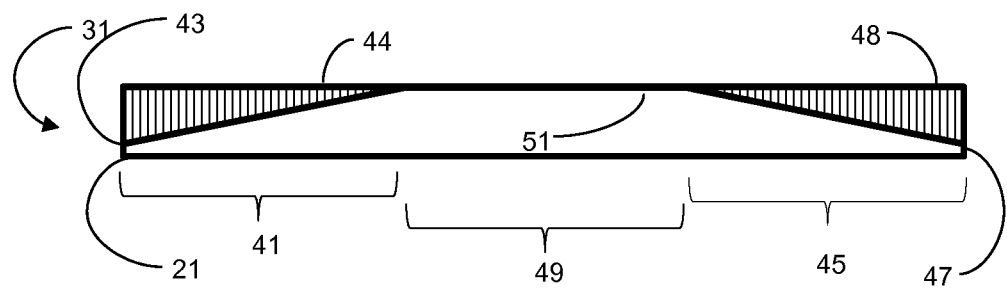
FIG. 5 is a non-limiting cross section of a liner in accordance with one embodiment.
Figure 6:
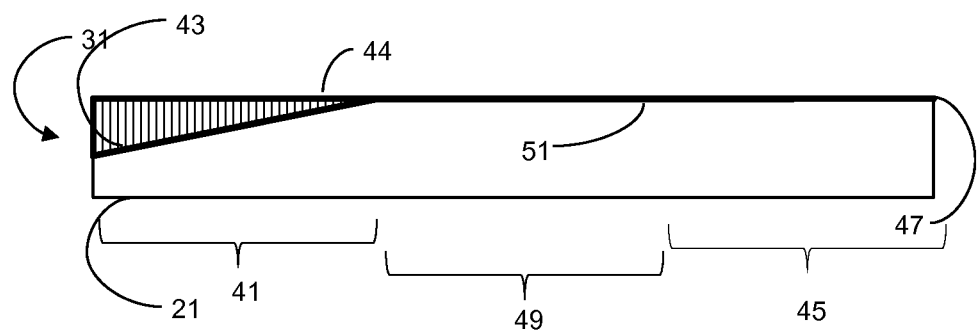
FIG. 6 is a non-limiting cross section of a liner in accordance with one embodiment.
Figure 7:
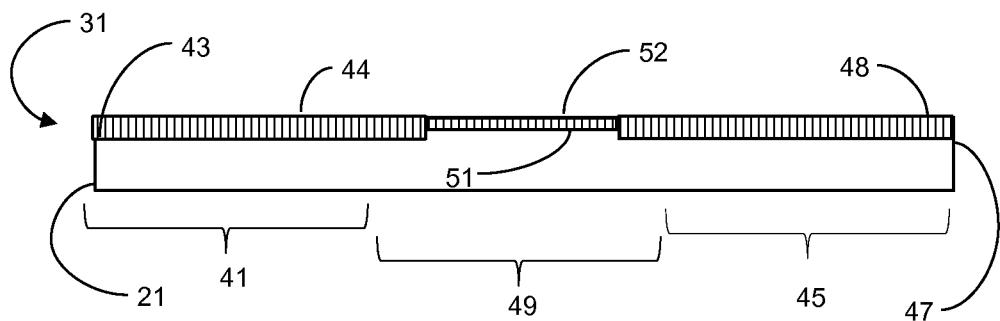
FIG. 7 is a non-limiting cross section of a liner in accordance with one embodiment.
Figure 8:
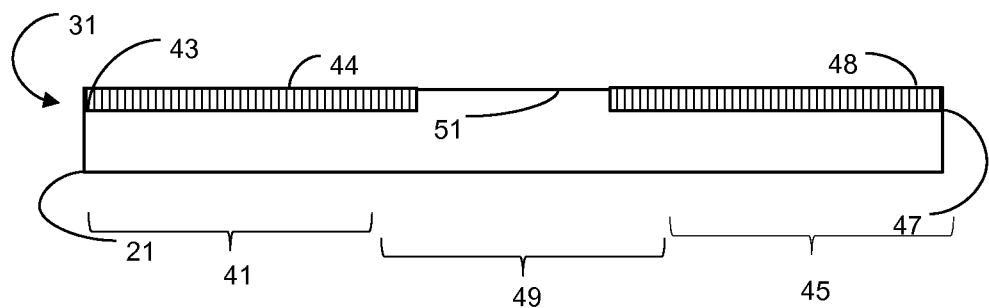
FIG. 8 is a non-limiting cross section of a liner in accordance with one embodiment.
Figure 9:
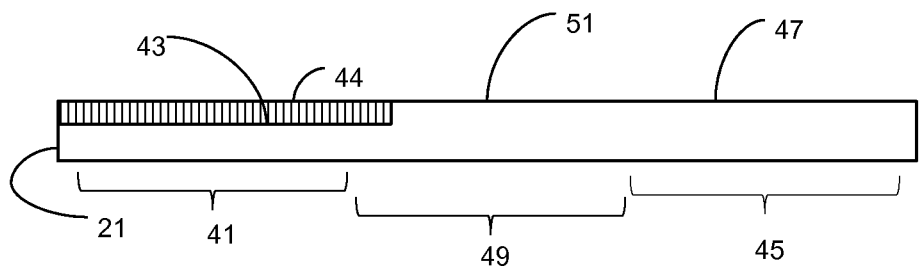
FIG. 9 is a non-limiting cross section of a liner in accordance with one embodiment.

FIGS. 4-9 illustrate various embodiments of coating applications that may be used to reduce the quantity of coating materials required for a cylinder liner 21. FIG. 4 illustrates a partial cross-section along the longitudinal axes of a cylinder liner 21. As shown in FIG. 4 the body of the cylinder liner 21 may be conceptually divided into three sections. The first end section 41 may correspond with the top dead center position for piston 23. The cylinder liner 21 may have a first interior surface 43 on which may be applied a first end section coating 44. A second end section 45 may correspond with the bottom dead center position for piston 23. The cylinder liner 21 may have a second interior surface 47 on which may be applied a second end section coating 48. Middle section 49 may be associated with a middle interior surface 51 on which a middle section coating 52 may be applied first end section coating 44, second end section coating 48, and middle section coating 52 may be the same material or may be comprised of different materials for the coating 31. In the embodiment illustrated in FIG. 4 the first end section coating 44 and a second end section coating 48 are thicker than the middle section coating 52, and may taper linearly from a thick portion to a center portion. FIG. 5 illustrates an embodiment where no middle section coating 52 is applied. FIG. 6 illustrates an embodiment where only the first end section coating 44 is applied. Although in the embodiment in FIGS. 4-6 the thickness of the coating varies linearly along the longitudinal axis of the cylinder liner 21, it would be apparent to one of ordinary skill in the art that the cross-section of the coating may encompass curves other than a straight line. FIGS. 7-9 illustrate embodiments where the thickness of the coating 31 varies in a step function. In FIG. 6, the coating is applied at the first interior surface 43 and the second interior surface 47. In this example the thickness of the first end section coating 44 and the second end section coating 48 do not vary along the longitudinal axis of the cylinder liner 21. Middle section coating 52 is thinner than the first end section coating 44 and the second end section coating 48. FIG. 8 illustrates an embodiment where no coating is applied to the middle interior surface 51. FIG. 9 illustrates an embodiment where only the first end section coating 44 is applied.

In one embodiment, coating of the cylinder liner 21 may be accomplished by any of the available methods of coating such as plasma spraying, high velocity oxygen fuel spraying, laser coating and chemical vapor deposition, and galvanic coating, among others. The coating process may include coating the first interior surface 43 with a first layer of predetermined thickness; coating the second interior surface 47 with a second layer of predetermined thickness; and leaving the middle interior surface 51 uncoated. In another embodiment coating may be accomplished by applying a coating on the middle interior surface 51 that is thinner than the first end section coating 44. In another embodiment the coating is only applied to the first interior surface 43.

As used herein, "a," "an," "the," "at least one," and "one or more" are used interchangeably. As used herein, the term "near" means being located in the vicinity of an area, location, or object. As used herein the term "linearly" is used to describe a direction that is substantially a straight line, and it may encompass a direction with a minor degree of curvature. As used herein, the "thickness" of coating is the dimension the coating along a radial direction. Also, as used herein, the term "thinner" relates to a thickness of the coating having a smaller dimension than a the dimension of a previously stated coating. As used herein the term "predetermined thickness" refers to a thickness established in advance to ensure protection of the cylinder liner from heat and contact damage.

As one of ordinary skill in the art will appreciate, the many varying features and configurations described above in relation to the several exemplary embodiments, may be further selectively applied to form the other possible embodiments of the present invention. For the sake of brevity and taking into account the abilities of one of ordinary skill in the art, all of the possible iterations is not provided or discussed in detail, though all combinations and possible embodiments embraced by the several claims below or otherwise are intended to be part of the instant application. In addition, from the above description of several exemplary embodiments of the invention, those skilled in the art will perceive improvements, changes and modifications. Such improvements, changes and modifications within the skill of the art are also intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

What is claimed:

1. A cylinder liner for an internal combustion engine comprising:
   a liner body comprising an annular wall having a first variable width along a longitudinal axis of the liner body, wherein the annular wall has a first end, a second end, and a middle portion; and
   a coating disposed on an interior surface of the annular wall and having a second variable width along the longitudinal axis, wherein a combination of both the annular wall and the coating define a width of the cylinder liner in a direction perpendicular to the longitudinal axis, the width being defined by both the first and second variable widths, and the width is constant along the longitudinal axis, wherein the second variable width of the coating on the annular wall decreases from the first end to the middle portion and increases from the middle portion to the second end.

2. The cylinder liner of claim 1, wherein the coating is thicker on the interior surface near the first end and the interior surface near the second end, and the interior surface of the middle portion is not coated.

3. The cylinder liner of claim 1, wherein the coating comprises a coating material selected from among a group consisting of ceramics, composites of ceramics and metals, metal alloys, and metal compounds.

4. The cylinder liner of claim 1, wherein the coating on the interior surface is thicker in a region of the interior surface corresponding to a top dead center position of a piston.

5. The cylinder liner of claim 1, wherein the coating on the interior surface is thicker in a region of the interior surface corresponding to a bottom dead center position of a piston.

6. An internal combustion engine assembly comprising:
   a piston;
   a liner having a liner body comprising an annular wall having a first variable width along a longitudinal axis of the liner body; and
   a coating disposed on an interior surface of the annular wall having a second variable width along the longitudinal axis, wherein a combination of both the annular wall and the coating define a width of the cylinder liner in a direction perpendicular to the longitudinal axis, the width being defined by both the first and second variable widths, and the width is constant along the longitudinal axis, wherein the second variable width of the coating decreases from a first end to a middle portion of the liner and increases in width from the middle portion to a second end of the liner.

7. The internal combustion engine assembly of claim 6, wherein the coating comprises a smaller dimension at a midstroke position of the piston than the coating adjacent at least one longitudinal end of the liner body.

8. The internal combustion engine assembly of claim 6, wherein the coating varies linearly along the longitudinal axis of the liner body.

9. The internal combustion engine assembly of claim 6, wherein the coating tapers from a thicker coating from the first end to a thinner coating at the middle portion of the liner.

10. The internal combustion engine assembly of claim 6, wherein the coating comprises a coating material comprising ceramics, composites of ceramics, composites of metals, metal alloys, metal compounds, or any combination thereof.

11. The internal combustion engine assembly of claim 6, wherein the coating on the interior surface is thicker in a region of the interior surface corresponding to a top dead center position of the piston.

12. The internal combustion engine assembly of claim 6, wherein the coating on the interior surface is thicker in a region of the interior surface corresponding to a bottom dead center position of the piston.

13. An internal combustion engine assembly comprising:
    a piston;
    a liner body comprising an annular wall having a first variable width along a longitudinal axis of the liner body, wherein the annular wall has a first end, a second end, and a middle portion; and
    a coating disposed on an interior surface of the annular wall and having a second variable width along the longitudinal axis, wherein a combination of both the annular wall and the coating define a width of the cylinder liner in a direction perpendicular to the longitudinal axis, the width being defined by both the first and second variable widths, and the width is constant along the longitudinal axis, wherein the second variable width of the coating on the annular wall decreases linearly from the first end to the middle portion and increases linearly from the middle portion to the second end.

14. The internal combustion engine assembly of claim 13, wherein the coating comprises a coating material selected from among a group consisting of ceramics, composites of ceramics and metals, metal alloys, and metal compounds.

15. The internal combustion engine assembly of claim 13, wherein the second variable width of the coating is thicker in a region of the interior surface corresponding to a top dead center position of the piston than the coating in a region of the interior surface corresponding to the middle portion.

16. The internal combustion engine assembly of claim 13, wherein the second variable width of the coating is thicker in a region of the interior surface corresponding to a bottom dead center position of the piston than the coating in a region of the interior surface corresponding to the middle portion.

17. The internal combustion engine assembly of claim 13, wherein the piston is configured to be coupled to a connecting rod and comprises compression rings and an oil control ring disposed on a periphery of the piston.

18. The internal combustion engine assembly of claim 13, wherein the second variable width of the coating on the annular wall decreases linearly in a substantially straight line.

19. The internal combustion engine assembly of claim 13, wherein the second variable width is predetermined to ensure protection of the liner body from heat and contact.

* * * * *